United States Patent [19]
Ichikawa et al.

[11] Patent Number: 4,874,303
[45] Date of Patent: Oct. 17, 1989

[54] TIRE VULCANIZING PRESS

[75] Inventors: Katumi Ichikawa, Akashi; Itaru Amano, Kobe; Yasuhiko Hujieda, Akashi; Shikao Misumi, Kobe; Seisuke Hukumura, Miki; Hideo Miyauchi, Kobe, all of Japan

[73] Assignee: Kabushiki Kaisha Kobe Seiko Sho, Kobe, Japan

[21] Appl. No.: 260,029

[22] Filed: Oct. 20, 1988

[30] Foreign Application Priority Data

Mar. 22, 1988 [JP] Japan .................. 63-68533

[51] Int. Cl.$^4$ ............................................. B29C 35/02
[52] U.S. Cl. ..................................... 425/28.1; 425/33; 425/36; 425/43; 425/48
[58] Field of Search ........................... 425/28.1, 31-33, 425/35, 36, 38, 43, 48; 264/315, 326

[56] References Cited

U.S. PATENT DOCUMENTS

| | | | |
|---|---|---|---|
| 2,514,215 | 7/1950 | Stevens et al. | 425/36 X |
| 2,959,815 | 11/1960 | Brundage | 425/36 X |
| 3,487,507 | 1/1970 | Turk | 425/36 X |
| 3,530,533 | 9/1970 | Turk et al. | 425/36 X |
| 4,236,883 | 12/1980 | Turk et al. | 425/36 X |
| 4,400,342 | 8/1983 | Logan | 425/32 X |
| 4,606,714 | 8/1986 | Nixon et al. | 425/28.1 |
| 4,608,219 | 8/1986 | Singh et al. | 425/38 X |
| 4,768,937 | 9/1988 | Singh | 425/36 |
| 4,800,059 | 1/1989 | Drewel et al. | 425/36 X |

FOREIGN PATENT DOCUMENTS 6036111 2/1985 Japan .
864443 4/1961 United Kingdom .................. 425/36

Primary Examiner—Richard L. Chiesa
Attorney, Agent, or Firm—Oblon, Spivak, McClelland, Maier & Neustadt

[57] ABSTRACT

Disclosed is a tire vulcanising press wherein a plurality of sectors provided for gripping the upper bead of a green tire loaded in position between a pair of upper and lower die elements to carry the green tire in a suspended condition will not form an obstruction to an elastic forming member for shaping. The tire vulcanizing press includes an inner cylinder mounted for up and down movement on the upper die element and having at a lower end portion thereof a bead ring which is capable of forming part of the upper die element, and a sector housing mounted for up and down movement in the inner cylinder and carrying thereon the sectors for movement between an open position and a closed position. The upper bead of the green tire can be gripped between the bead ring and sectoral portions of the sectors, and the sectoral portions of the sectors are accommodated in the lower end portion of the inner cylinder when the sectors are in the closed position. Also a ring fitting portion is provided for receiving and retaining therein during vulcanization an upper mounting ring on which the elastic forming member is provided.

5 Claims, 20 Drawing Sheets

TIRE VULCANIZING PRESS

BACKGROUND OF THE INVENTION

1. Field of the Invention

This invention relates to a tire vulcanizing press.

2. Description of the Prior Art

A tire vulcanizing press includes an upper die element and a lower die element mounted for opening and closing movement relative to each other and shapes the profile of the inner face of and vulcanizes a green tire loaded in position between the upper and lower die elements by means of an expandable and contractible elastic forming member and a heated pressurizing medium supplied into the elastic forming member.

In the case of such a tire vulcanizing press as described just above, conventionally it is the practice to place a green tire on the lower die element. According to this common practice, however, the green tire is sometimes deformed into a flattened configuration by its own weight.

An improved device for positioning a green tire accurately on a die element is disclosed in Japanese Patent Laid-Open No. 60-36111 wherein a green tire loaded in position between a pair of die elements is gripped by and held in a suspended condition on a rubber bag and, before performing shaping, while the upper and lower bead portions of the green tire are contacted with upper and lower bead rings of the die elements, pressurized fluid for inflating the green tire is supplied into the green tire to position the green tire accurately on the die elements.

The improved device disclosed in Japanese Patent Laid-Open No. 60-36111 is significant in its own way in that a green tire is held in a suspended condition. However, it involves a rubber bag provided at a central portion of an upper die element for suspending a green tire thereon.

The rubber bag is exposed to a high temperature within the die elements. Accordingly, it is a problem that the life of the rubber bag is very short.

Further, in the prior device, a filling plate for forwarding tire inflating pressurized fluid is projected below the tire suspending rubber bag. Accordingly, it is a problem that the projection forms an obstruction to shaping of a tire by means of an elastic forming member from below, which will deteriorate accuracy in shaping. It is also a problem that the durability of the elastic forming member will be deteriorated.

SUMMARY OF THE INVENTION

It is an object of the present invention to provide an improved tire vulcanizing press wherein, while a mechanical link mechanism including a plurality of sectors mounted for opening and closing movement in radially outward and inward directions is employed as means for gripping the upper bead of a green tire loaded in position between a pair of die elements to carry the green tire in a suspended condition thereon, the sectors will not form an obstruction to an elastic forming member for shaping.

In order to attain the object, according to the present invention, therein is provided a tire vulcanizing press wherein an upper die element and a lower die element are mounted for opening and closing movement relative to each other and a plurality of sectors each having a link extending in a vertical direction and a sectoral portion extending in a radially outward direction from a lower end of the link are mounted in a radial arrangement for movement between an open position and a closed position such that an upper bead of a green tire may be gripped and loaded in position between the die elements by means of the sectors and wherein the inner face of a tire loaded in position between the die elements is shaped and the tire is vulcanized by means of an expandable and contractible elastic forming member and heated pressurizing medium supplied into the elastic forming member, the tier vulcanizing press comprising an inner cylinder mounted for relative up and down movement on the upper die element and having at a lower end portion thereof a bead ring which is capable of forming part of the upper die element, and a sector housing mounted for relative up and down movement in the inner cylinder and carrying thereon the plurality of sectors for movement between the open position and the closed position, the upper bead of the green tire being capable of being gripped between the bead ring provided on the inner cylinder and the sectoral portions of the sectors, the sectoral portions of the sectors being capable of being accommodated in the lower end portion of the inner cylinder when the sectors are in the closed position, and a ring fitting portion being provided for receiving and retaining therein during vulcanization an upper mounting ring which has the elastic forming member thereon.

The ring fitting portion may be formed on the lower side of the sectoral portions of the sectors.

Preferably, a filler ring is mounted at a lower end portion of the sector housing, and the sectoral portions of the sectors in the closed position are placed on the filler ring. The sector portions of the sectors can be projected in radially outward directions farther than the filler ring in order to grip the upper bead of the green tire thereon, and the ring fitting portion is provided on the lower face side of the filler ring which is located below the sectoral portions of the sectors.

Concave and convex means may be provided on mutually contacting faces of the sectoral portions of the sectors and the filler ring for guiding the sectors for movement between the open position and the closed position and for preventing the elastic forming member from advancing between the filler ring and the sectoral portions of the sectors in the open position.

The filler ring may be finished into a mirror surface by chrome plating or the like to reduce abrasion thereof by sliding contact thereof with the elastic forming member.

With the tire vulcanizing press according to the present invention, a green tire to be loaded in position between the die elements is loaded in position in a suspended condition. Accordingly, there is a basic effect that deformation of the tire in a free condition into a flattened configuration can be prevented. In addition, the following effects can be anticipated.

Since the mechanical means including the upper bead ring provided on the lower end side of the inner cylinder and the sectoral or chucking portions at the lower end side of the openable and closeable sectors accommodated in the inner cylinder is employed as means for suspending a green tire thereon, even if it is exposed to a high temperature, the durability of it will not be deteriorated.

Further, since the upper bead of a tire can be gripped substantially over the entire circumference thereof from inside and outside by and between the upper bead ring and the sectoral portions of the sectors, the suspended condition of the tire can be maintained with certainty.

In addition, since the upper bead ring has a function of chucking a tire and a function as part of the die, the tire vulcanizing press can have a reduced number of components and be simplified in structure. Particularly since the upper bead ring which is essential as part of the die has a chucking function, the simplification of structure is significant.

Also, since the sectors are provided in a radial arrangement and the sectoral portions thereof are accommodated in the lower end side of the inner cylinder when the sectors are in the closed position, interference of the sectors with a top portion of the central mechanism can be prevented, and since the sectoral portions are accommodated in the lower end portion of the inner cylinder, the upper bead ring can be fixedly retained during vulcanization and accordingly a tire of a high quality can be formed on the tire vulcanizing press.

Further, since the fitting portion for receiving and fitting the upper mounting ring of the central mechanism therein is provided, not only interference of an upper portion of the central mechanism can be prevented, but also centering of the central mechanism can be assured and a tire can be formed without causing an eccentricity.

Where the filler ring is provided below the sectoral portions of the sectors and mounted on the lower end side of the sector housing, it prevents the elastic forming member from contacting directly with the sectoral portions of the sectors. Accordingly, possible damage to the elastic forming member can be eliminated, which improves the life of the elastic forming member.

Further, since the filler ring is mounted on the sector housing for integral up and down movement in the inner cylinder and the fitting portion for fitting with the upper mounting ring is formed on the lower face side of the filler ring, misalignment of the central mechanism can be prevented perfectly.

Where concave and convex means are provided on the contacting faces of the filler ring and the sectoral portions of the sectors and the gap between the filler ring and the sectoral portions can be minimized by the concave and convex means, not only the elastic forming member is prevented perfectly from being squeezed between them but also the sectoral portions of the sectors can be guided for movement the open and closed positions by the concave and convex means, which assures suspension of a tire by the sectors.

The above and other objects, features and advantages of the present invention will become apparent from the following description and the appended claims, taken in conjunction with the accompanying drawings.

DESCRIPTION OF THE PREFERRED EMBODIMENTS

Figure 1:
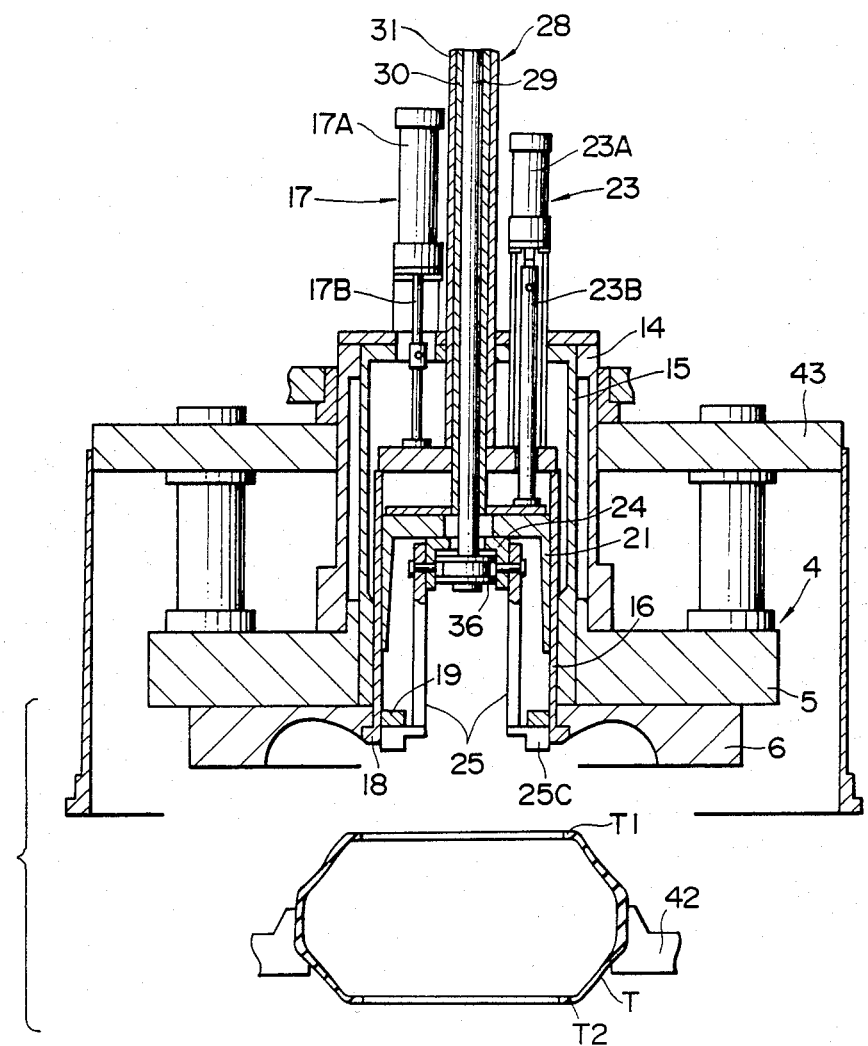
FIG. 1 is a vertical sectional view of an upper section of a tire vulcanizing press showing a first preferred embodiment of the present invention.
Figure 2:
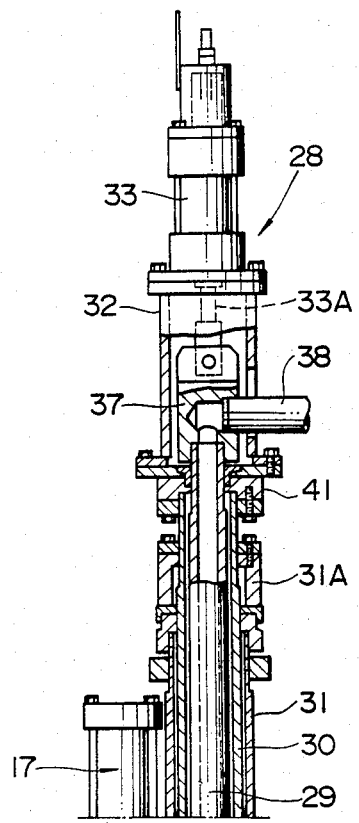
FIG. 2 is an enlarged vertical sectional view of an upper portion of the upper section of the tire vulcanizing press of FIG. 1.

Referring first to FIGS. 1 to 8, there is shown a tire vulcanizing press according to a first preferred embodiment of the present invention. The tire vulcanizing press shown includes a lower die element 1 which includes a lower die half 3 provided on a lower platen 2 in which a vulcanizing source is located.

The tire vulcanizing press further includes an upper die element 4 which includes an upper die half 6 provided on an upper platen 5 in which a heating source is built.

Figure 14:
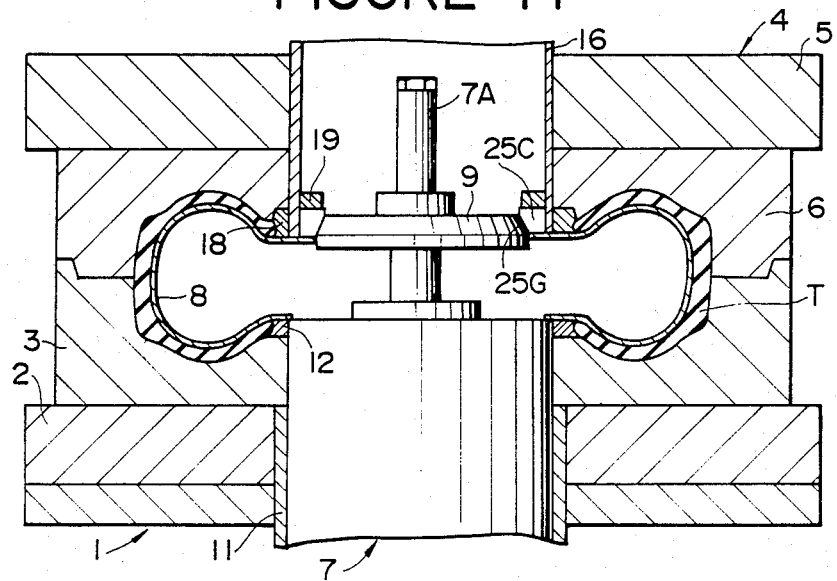

In the tire vulcanizing press of the embodiment shown, the upper die element 4 is mounted either for tilting movement or for up and down movement relative to the lower die element 1 so as to permit closing and opening of the die, that is, closing and opening movement of the upper and lower die elements 1 and 4 relative to each other. When the lower and upper dies 3 and 6 are in a closed position as shown in FIG. 14, they are engaged with each other to complete the die for forming the profile of a green tire T having pair of shaped upper and lower beads T1 and T2, and a heated pressurizing medium such as steam can be supplied into the die from an outer peripheral region of the upper and lower dies 3 and 6.

Figure 5:
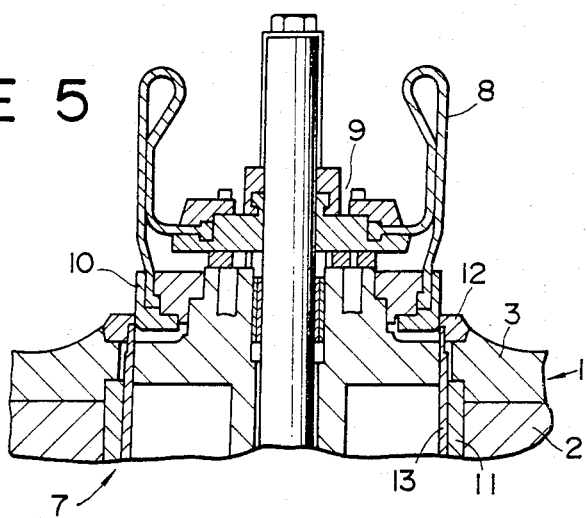
FIG. 5 is a vertical sectional view of an essential part of a central mechanism of the tire vulcanizing press of FIG. 1.

Referring to FIG. 5, the tire vulcanizing press further includes a central mechanism 7 disposed in a coaxial relationship on the center of the die half 3 of the lower die element 1. A bladder in the form of an expandable rubber bag, that is, an elastic forming member 8 for formation of an inner wall of a tire, is mounted on the central mechanism 7 by means of an upper mounting ring 9 and a lower mounting ring 10.

During shaping, a pressurizing medium such as steam under a pressure of 2 to 3 kg/cm² can be supplied into the inside of the elastic forming member 8 of the central mechanism 7 through a lower region of the elastic forming member 8, and during vulcanization, the pressure of the pressuring medium can be raised, for example, to 21 kg/cm² or so (at the temperature of 180° C. or so), but after vulcanization, the pressurizing medium can be drained from the elastic forming member 8.

The central mechanism 7 further includes a tubular member 13 fitted for up and down movement in a fixed guide tube 11 which is provided on and extends in a vertical direction in the lower die element 1. A lower bead ring 12 constituting part of the lower die half 3 is mounted at the top of the tubular member 13. Thus, the elastic forming member 8 is expanded and contracted as the upper and lower mounting rings 9 and 10 are moved up and down relative to each other in the tubular member 13.

Figure 3:
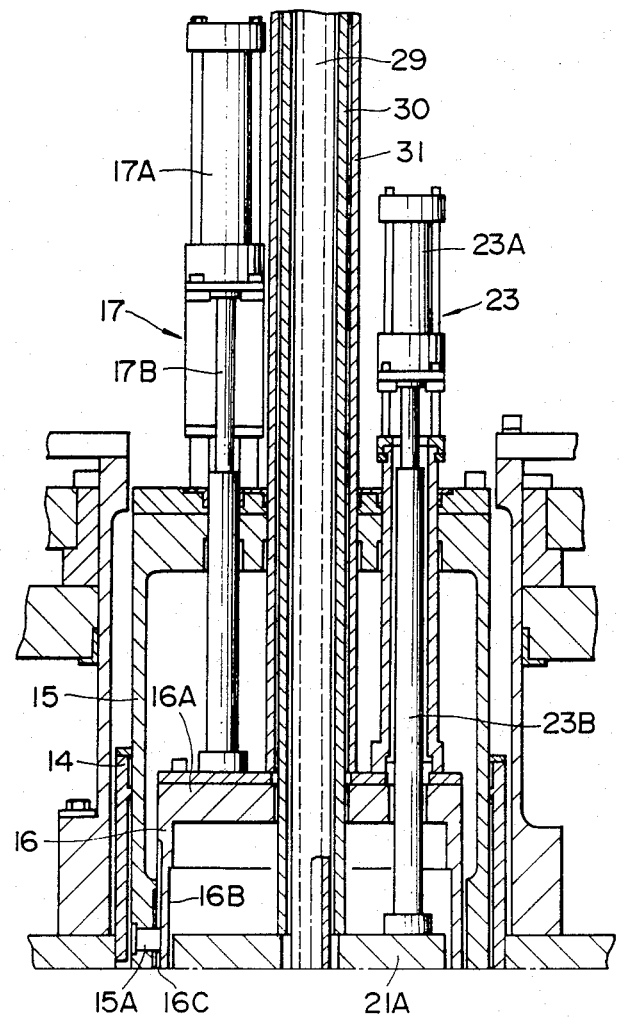
FIG. 3 is an enlarged vertical sectional view of a mid portion of the upper section of the tire vulcanizing press of FIG. 1.
Figure 4:
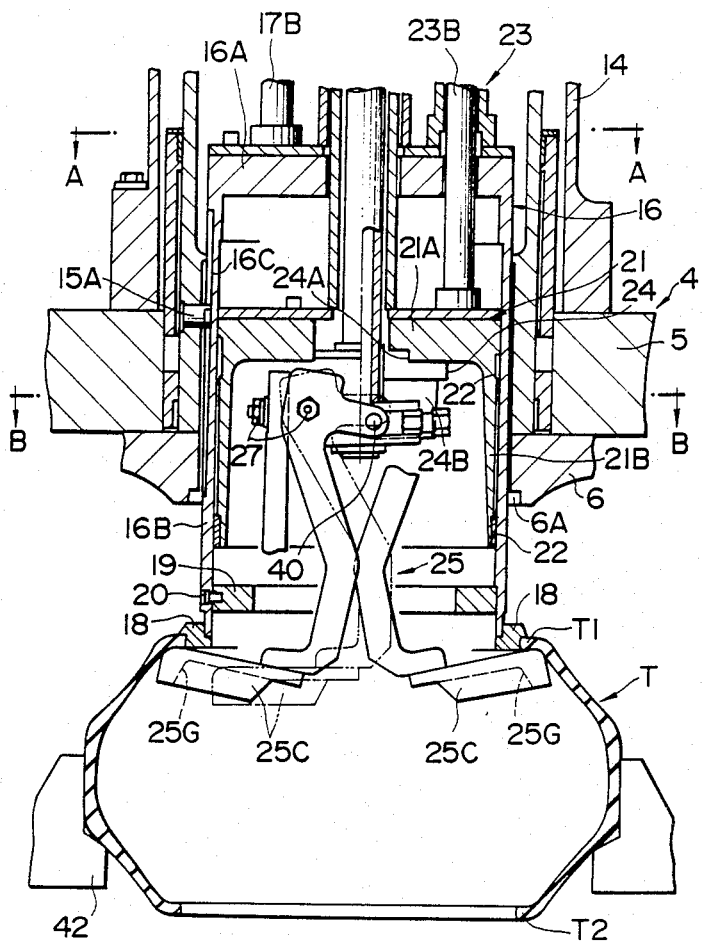
FIG. 4 is an enlarged vertical sectional view of a lower portion of the upper section of the tire vulcanizing press of FIG. 1 additionally illustrating an operating condition of the tire vulcanizing press.

Referring to FIGS. 1, 3 and 4, the tire vulcanizing press further includes an upper guide tube 14 uprightly secured to the upper platen 5. An outer cylinder 15 is fitted for up and down movement in the upper guide tube 14.

An inner cylinder 16 is fitted for up and down movement in the outer cylinder 15 and has a cap portion 16A and a tubular portion 16B. The tubular portion 16B of the inner cylinder 16 has a guide groove 16C formed to extend in a vertical direction on an outer periphery thereof. A guide shoe 15A is mounted on the outer cylinder 15 and held in engagement with the guide groove 16C of the tubular portion 16B of the inner cylinder 16.

An inner cylinder actuating member 17 includes a fluid cylinder 17A mounted uprightly on a cap portion 35 of the outer cylinder 15, and a piston rod 17B extending from a piston fitted in the cylinder 17A. The piston rod 17B is connected at a lower end thereof to the cap portion 16A of the inner cylinder 16.

Figure 6:
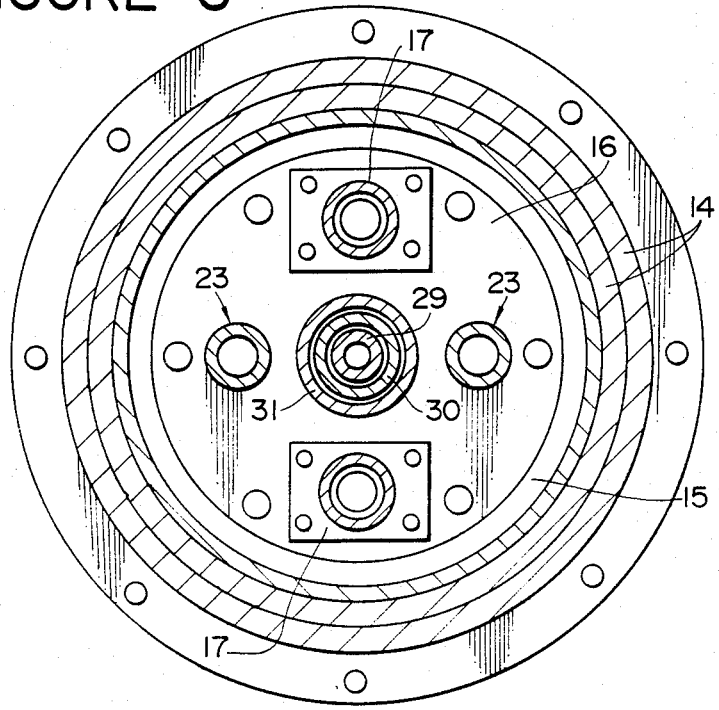
FIG. 6 is an enlarged horizontal sectional view taken along line A—A of FIG. 4.

Accordingly, the inner cylinder 16 is moved up and down by expanding and contracting movement of the inner cylinder actuating member 17. Actually, a pair of such actuating members 17 are provided at diagonal locations as seen in FIG. 6.

An upper bead ring 18 is adapted to make part of the upper die half 6 and removably mounted on the lower end side of the tubular portion 16B of the inner cylinder 16 by means of a screw structure or the like. A sector restricting ring 19 is fastened to a portion of the tubular portion 18B of the inner cylinder 16 a little above the upper bead ring 18 by means of a screw 20.

Accordingly, the upper bead ring 18 is fitted into an annular recess 6A of the upper die half 6 so as to constitute part of the upper die half 6 when the inner cylinder 16 is moved to an upward position, but when the inner cylinder 16 is moved down, the upper bead ring 18 is moved downwardly out of the recess 6A of the upper die half 6.

A sector housing 21 is fitted in the inner cylinder 16. The sector housing 21 includes a cap portion 21A and a tubular portion 21B and is supported for up and down movement relative to the inner cylinder 16 by means of a slide bush 22 or the like.

A pair of actuating members 23 for actuating the sector housing 21 are disposed at locations displaced by 90 degrees in the phase from the inner cylinder actuating members 17 as shown in FIG. 6. Each of the sector housing actuating members 23 includes a fluid cylinder 23A mounted on the cap portion 16A side of the inner cylinder 16, and a piston rod 23B extending from a piston fitted in the cylinder 23A. The piston rod 23B of the actuating member 23 is connected at a lower end thereof to the cap portion 21A of the sector housing 21.

Accordingly, the sector housing 21 can be moved up and down in and relative to the inner cylinder 16 by expanding and contracting motion of the sector housing actuating member 23.

A sector mounting member 24 is removably secured to the cap portion 21A of the sector housing 21 by means of a bolt or the like (not shown) with an annular seat portion 24A thereof fitted in a central portion of a lower end wall of the cap portion 21A of the sector housing 21. The sector mounting member 24 has four leg portions 24B formed thereon below the annular seat portion 24A thereof and extending downwardly therefrom. The four leg portions 24B of the sector mounting member 24 are circumferentially displaced from each other by an angle of 90 degrees in phase as viewed in plan as seen in FIG. 7.

A sector 25 is provided for each of the leg portions 24B of the sector mounting member 24. Referring to FIG. 8, the sector 25 includes a link 25B in the form of a flat plate having an arm 25A, and a sectoral or part-circular part 25C secured to a lower end of the link 25B by means of a bolt 26 or the like and extending substantially in a horizontally radially outward direction. The sectoral part 25C of the sector 25 has a sectoral or partly-circular shape as viewed in plan as seen in FIG. 7.

The link 25B of the sector 25 extends in a vertical direction and has a mounting hole 25E formed in a boss portion 25D thereof. The link 25B has a profile like a a so-called "goose neck" as apparently seen in FIG. 8. A roller mounting hole 25F is formed in the arm 25A of the link 25B.

Figure 7:
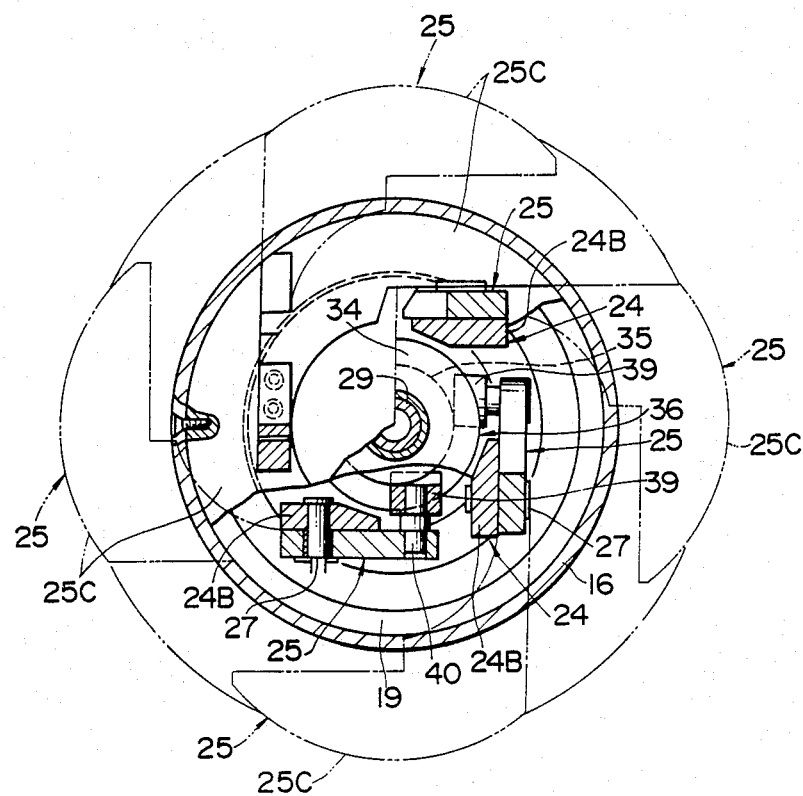
FIG. 7 is a horizontal sectional view taken along line B—B of FIG. 4, in a rather enlarged scale, additionally illustrating an operating condition of the tire vulcanizing press.
Figure 8:
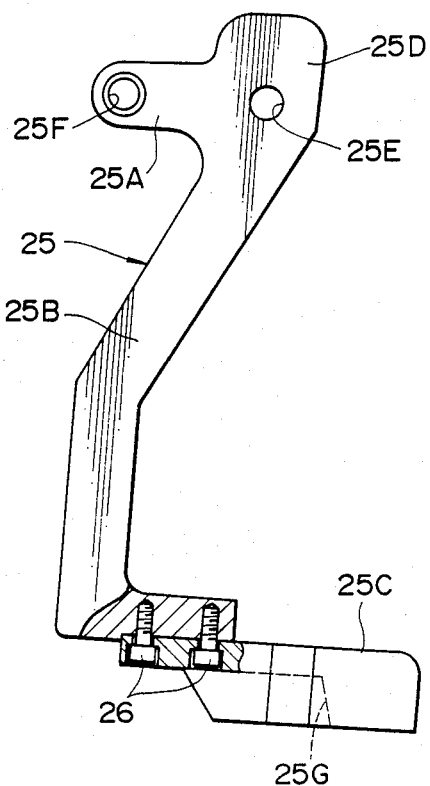
FIG. 8 is an enlarged elevational view, partly in section, showing a sector of the tire vulcanizing press of FIG. 1.

Meanwhile, the sectoral part 25C has a so-called "sickle shape" as particularly seen in FIG. 7 and has a ring fitting recess 25G formed in a bottom wall thereof.

The sectors 25 are supported for rocking motion around an axis of a pivot shaft 27 which extends circularly through the leg portions 24B of the sector mounting member 24 and also through the mounting holes 25E in the sectors 25. Each of the sectors 25 is arranged such that the arm 25A thereof extends in a tangential direction to an outer periphery of the annular seat portion 24A of the sector mounting member 24 and the link 25B thereof is accommodated in the inner cylinder 16 and extends in a vertically downward direction and besides the sectoral part 25C thereof can be pivoted between an open position and a closed position around the pivot shaft 27. When the sectoral portions 25C are in the respective closed positions, they are accommodated within the lower portion of the inner cylinder 16 under the sector restricting ring 19 so that they generally exhibit a substantially circular profile as seen in FIG. 7, but when the sectoral parts 25C are in the respective open positions, they are expanded radially outwardly so that they may be engaged from the radially inner side with the upper bead T1 of a green tire T as seen in FIGS. 4 and 7.

A mechanism 28 for opening and closing the sectors 25 includes an inner tube 29, an outer tube 30, a guide tube 31 and so on and is provided at the center of the die elements 1 and 4 on the upper die element 4 side such that the tubes 29, 30 and 31 thereof may have a common axis at the center of the die elements 1 and 4.

The guide tube 31 is provided uprightly on the cap portion 16A of the inner cylinder 16 and has a stopper 31A at a top portion thereof. The outer tube 30 is fitted in the guide tube 31 for up and down movement relative to each other and is mounted uprightly at a lower end thereof on the cap portion 21A of the sector housing 21. A fluid cylinder 33 is mounted at an upper portion of the outer tube 30 by way of a mounting base 32.

Further, the inner tube 29 is fitted in the outer tube 30 and extends through the sector mounting member 24. A cam ring 36 is mounted at a lower end of the inner tube 29 and has a circumferential groove 36 formed between a pair of upper and lower flanges 34 thereof. A piston rod 33A of the fluid cylinder 33 is connected to an upper end of the inner tube 29 by way of an air feeding elbow 37. An air feeding pipe 38 for a pressurizing fluid (i.e., air) is communicated with the air feeding elbow 37 so that pressurizing fluid may be fed into the die elements 1 and 4 from the lower end of the inner tube 29 by way of the inner tube 29.

A cam roller 39 is mounted on each of the sectors 25 with a roller supporting shaft 40 thereof fitted in the mounting hole 25F of the arm of the sector 25. The cam rollers 39 are fitted in the circumferential groove 35 of the cam ring 36 as seen in FIG. 7.

Accordingly, the sectors 25 can be moved up and down in a vertical direction together with the sector housing 21 and also can be rocked or opened and closed around the pivot shaft 27 through engagement of the cam rollers 38 thereon with the circumferential groove 35 of the cam ring 36 as the fluid cylinder 33 expands and contracts to move the inner tube 30 up and down.

A stroke adjusting member 41 is located for abutting engagement with the stopper 31A of the guide tube 31 in order that the stroke of upward movement of the sector housing 21 may be adjusted.

Reference numeral 42 denotes a carrying in member for a green tire T, and 43 denotes an upper dome.

Referring now to FIGS. 16 to 20, there is shown a tire vulcanizing press according to a second preferred embodiment of the present invention which is an improvement to the tire vulcanizing press of the first embodiment described above. Since the basic construction and operation of the tire vulcanizing press of the second embodiment are substantially similar to those of the tire vulcanizing press of the first embodiment, such common parts or elements are denoted by common reference numerals, and a description will be given principally of differences between the tire vulcanizing presses.

Figure 16:
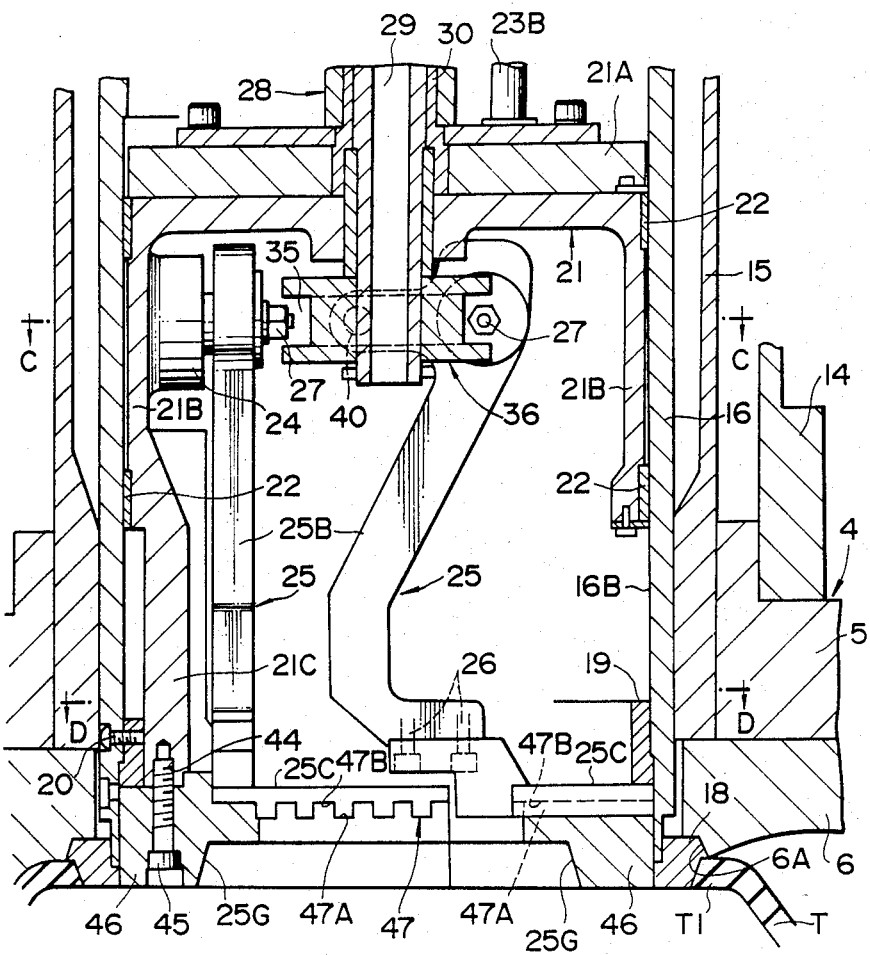
FIG. 16 is a vertical sectional view of essential part of a tire vulcanizing press showing a second preferred embodiment of the present invention.
Figure 17:
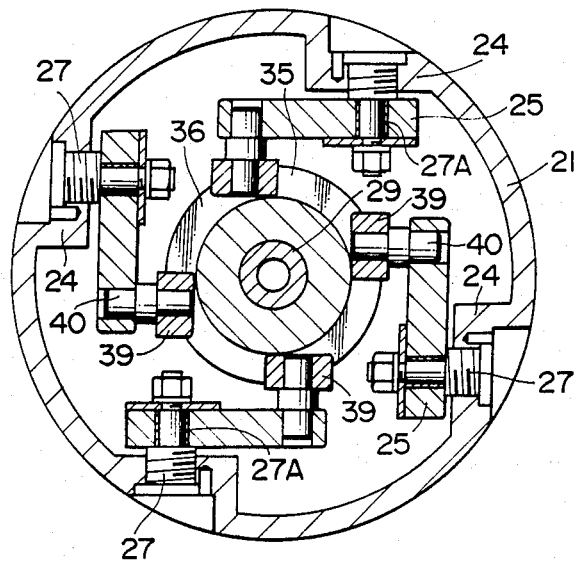
FIG. 17 is a sectional view taken along line C—C of FIG. 16.

Referring first to FIGS. 16 and 17, a total of four sector mounting members 24 are formed on an inner circumferential wall of a tubular portion 21B of a second housing 21, and a sector 25 is supported at an upper portion thereof for rocking motion on each of the sector mounting members 24 by way of a pivot shaft 27, a bush 27A and so on. A cam roller 39 provided on each of the sectors 25 is fitted in a circumferential groove 35 of a cam ring 36.

Figure 18:
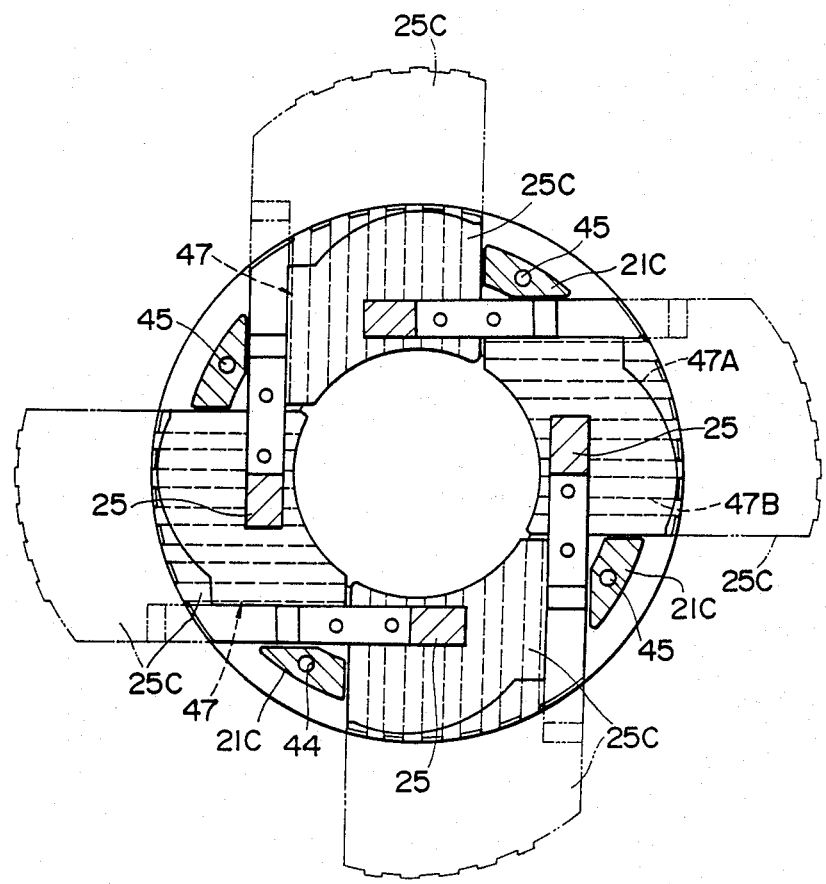
FIG. 18 is a sectional view taken along line D—D of FIG. 16.

Referring to FIG. 18, a total of four legs 21C extend downwardly from a lower end of the tubular portion 21B of the sector housing 21 in a radial arrangement as viewed in plan, and a filler ring 46 is mounted on the lower end side of the sector housing 21 by screwing bolts 45 from the below into threaded holes 44 formed in the individual legs 21C of the sector housing 21. The filler ring 46 is fitted for up and down movement on an inner circumferential wall of an inner cylinder 16.

The filler ring 46 has an outer surface finished with a mirror surface by chrome plating or the like, and a ring fitting portion 25G is formed on a lower face of the ring 46 for receiving and retaining therein an upper mounting ring 9 which has an elastic forming member 8 thereon.

Further, each of the sectors 25 has a sectoral portion 25C which is placed on the filler ring 46 when the sectoral portions 25C are in their closed position. The filler ring 46 is thus positioned below the sectoral portions 25C of the sectors 25 and has a function as a protector for preventing the elastic forming member 8 from contacting directly with the sectoral portions 25C of the sectors 25.

Concave and convex means 47 are provided on mutually contacting faces of the sectoral portions of the sectors 25 and the filler ring 46. The concave and convex means 47 are formed to extend in such a direction as to guide the opening and closing directions of the sectoral portions 25C of the sectors 25 and are composed, in the case of the present embodiment, of convex and concave ribs 47A in the form of teeth formed on lower faces of the sectoral portions 25C and convex and concave ribs 47B in the form of teeth formed on an upper face of a filler ring 46. The concave and convex robs 47A ad 47B are arranged for engaging with each other.

Figure 20:
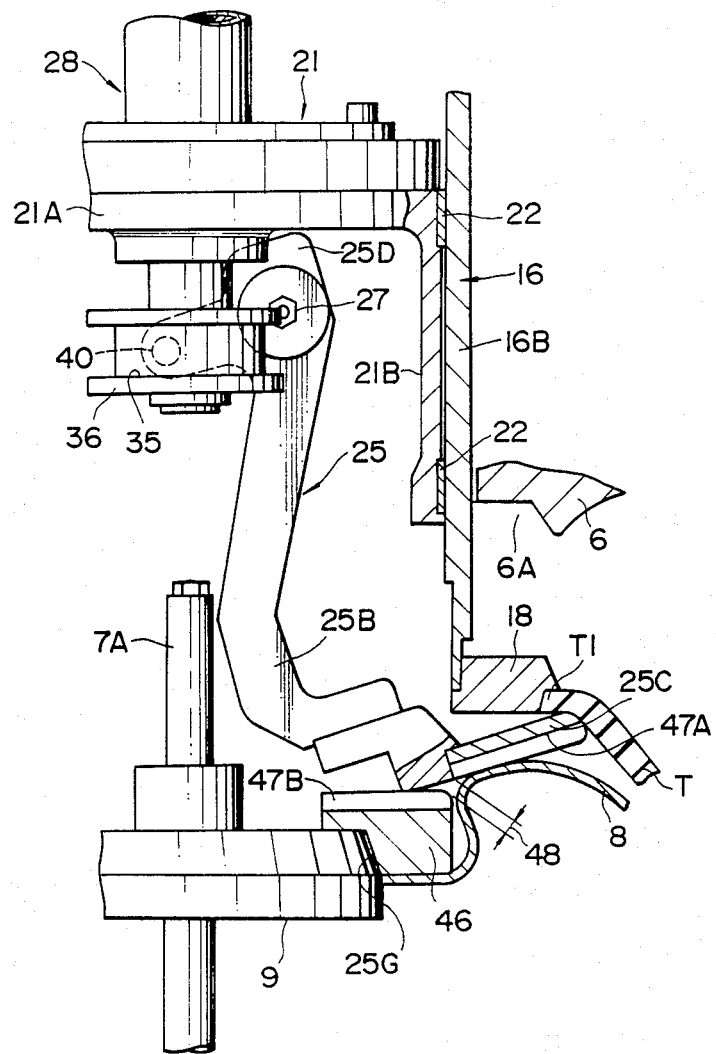

It will become apparent from the description of operation of the tire vulcanizing press given below that the concave and convex means 47 are effective to minimize the gap 48 between the sectoral portions 25C of the sectors 25 and the upper face of the filler ring 46 to prevent the elastic forming member 8 from advancing between and being squeezed by them as seen in FIG. 20.

Figure 21:
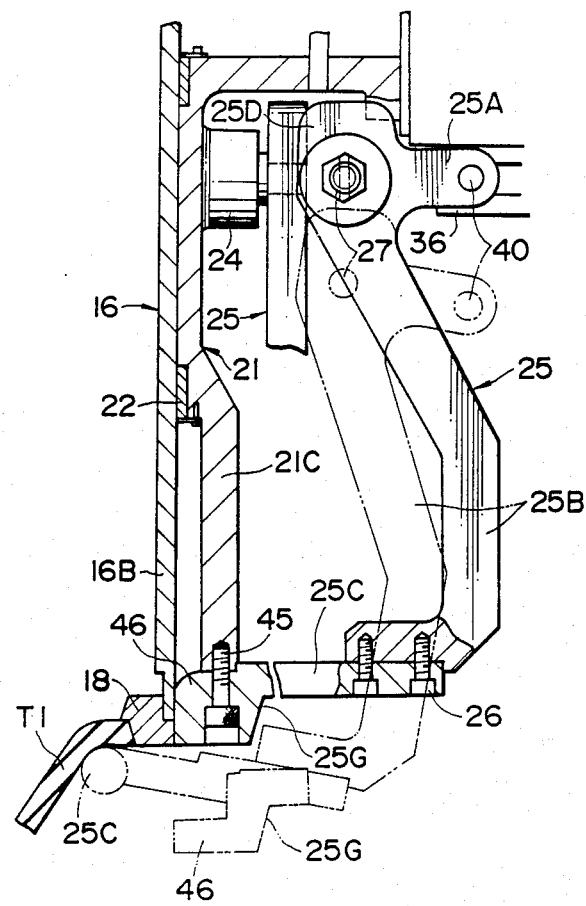
FIG. 21 is a vertical sectional view of an essential part of a tire vulcanizing press showing a third preferred embodiment of the present invention.
Figure 22:
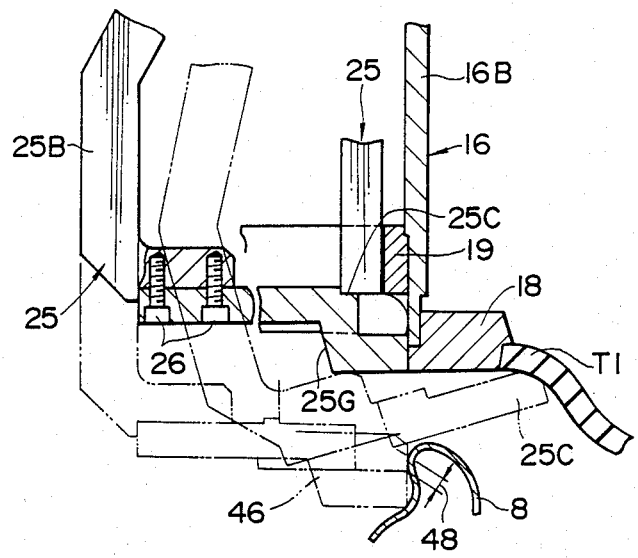
FIG. 22 is an enlarged partial vertical sectional view illustrating operation of the tire vulcanizing press of FIG. 21.

Referring now to FIGS. 21 and 22, there is shown a tire vulcanizing press according to a third preferred embodiment of the present invention which is different from the tire vulcanizing press of the second embodiment described above in that no concave and convex means 47 are formed between sectoral portions 25C of sectors 25 and a filler ring 46. Also in the tire vulcanizing presses of the second and third embodiments, the filler ring 46 is formed in such a manner as to control the resistance or friction thereof against sliding contact thereof with the elastic forming member 8 and be rounded at corners thereof to soften abutment thereof in consideration of prevention of a damage to the elastic forming member 8 upon sliding contact with the filler ring 46.

Subsequently, a series of different steps of operation of the tire vulcanizing press of the first embodiment of the present invention will be described with reference to the FIGS. 9 to 15, and in this connection, operation of the tire vulcanizing presses of the second and third embodiments will also be described.

Figure 9:
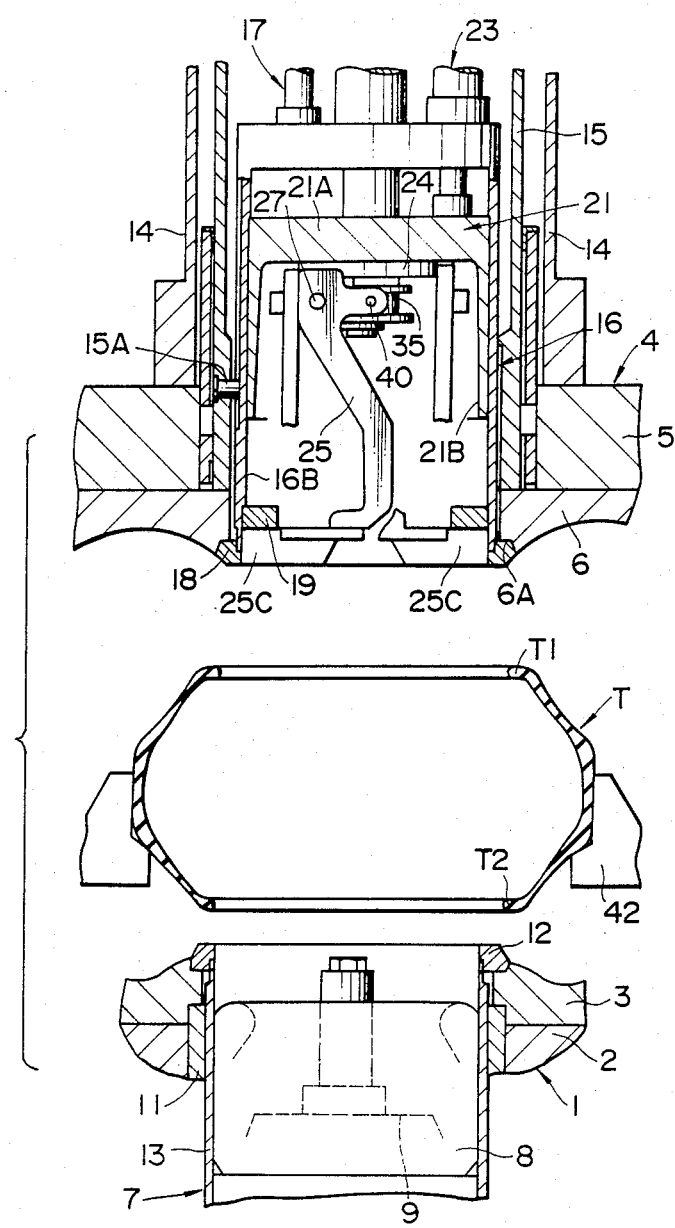
FIGS. 9 to 15 are vertical sectional views illustrating a series of different steps of operation of the tire vulcanizing press of FIG. 1 beginning with loading of a green tire and ending with removing of a completed tire.

FIG. 9 illustrates the tire vulcanizing press in a condition wherein the upper die element 4 and the lower die element 1 are in a mutually opened or spaced condition; the upper bead ring 18 and the lower bead ring 12 are fitted in the die halves 6 and 3, respectively; the sectors 25 are in their closed position in which the sectoral portions 25C thereof are accommodated in the inner cylinder 16; and the central mechanism 7 is in its stand-by condition.

In this condition, a green tire T is carried in by the carrying in member 42 to a predetermined position between the die elements 4 and 1 in which it is substantially concentrical with the die elements 4 and 1.

After the green tire T has been loaded in position between the die elements 4 and 1, the inner cylinder 16 is moved down by an expanding motion of the actuating member 17 so that the upper bead ring 18 is removed from the recess 6A of the upper die half 6 and then pressed against the upper bead T1 of the green tire T, thereby assuming a suspension preparing posture for the tire T.

It is to be noted that the downward movement of the inner cylinder 16 is made with certainty in the vertical direction by the engagement between the guide show 15A on the outer cylinder 15 and the guide groove 16C in the inner cylinder 16.

After the inner cylinder 16 has been moved down until the upper bead ring 18 is pressed against the upper beam T1 of the green tire T, the sector housing actuating member 23 is expanded so that the sector housing 21 is moved down relative to and below the inner cylinder 16 substantially in a simultaneous relationship to such pressing of the inner cylinder 16 against the upper beam T1 of the green tire T. Upon such downward movement of the sector housing 21, the sectors 25 thereon are moved vertically downwardly while maintaining their closed position until they extend downwardly below the upper bead ring 18 and the sectoral portions or chucking portions 25C thereof are inserted into the green tire T from the upper bead T1 side of the green tire T as seen in FIG. 10.

Figure 19:
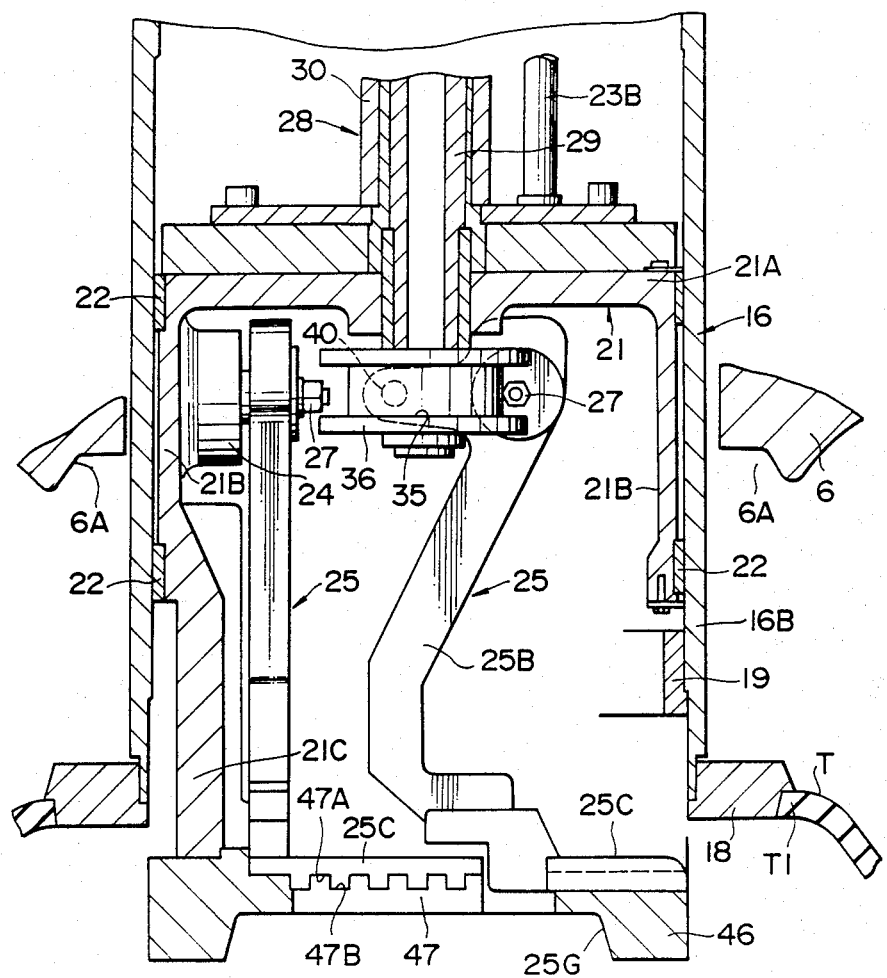
FIGS. 19 and 20 are partial vertical sectional views illustrating different steps of operation of the tire vulcanizing press of FIG. 16.

In the case of the tire vulcanizing press of the second embodiment, the sectoral portions 25C of the sectors 25 are positioned below the upper bead ring 18 while the filler ring 46 underlies the sectoral portions 25C as seen in FIG. 19 (this applies also to the tire vulcanizing press of the third embodiment).

Figure 10:
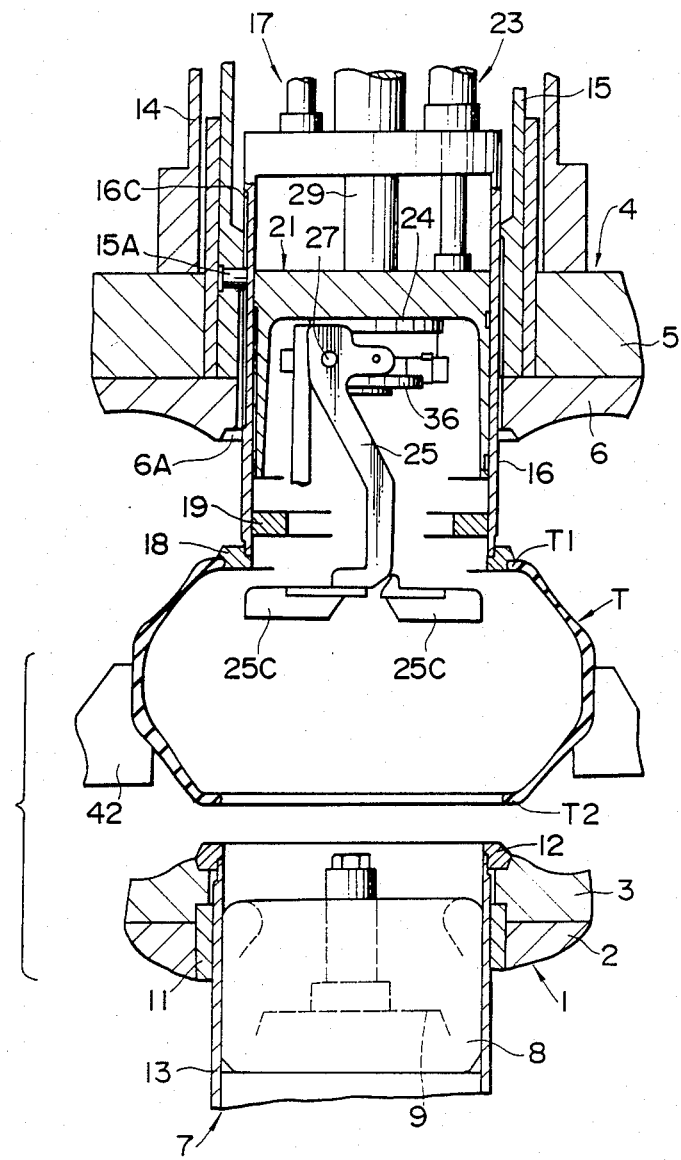

The condition illustrated in FIG. 10 or 19 exhibits a substantial hanging preparing posture for the green tire T.

Figure 11:
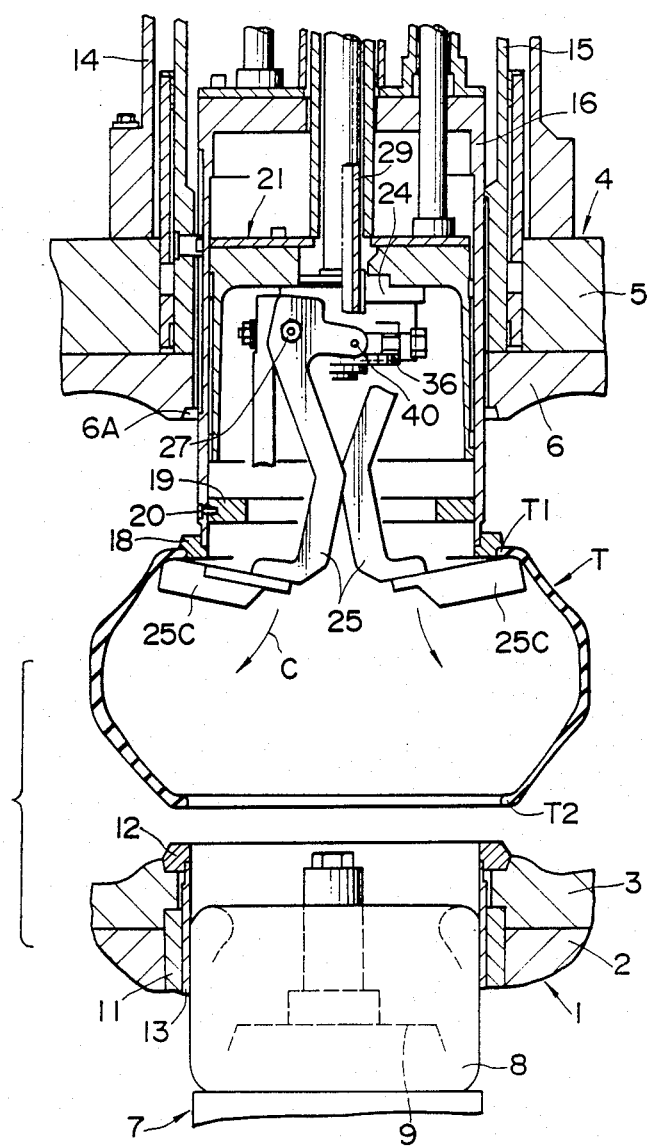
Figure 12:
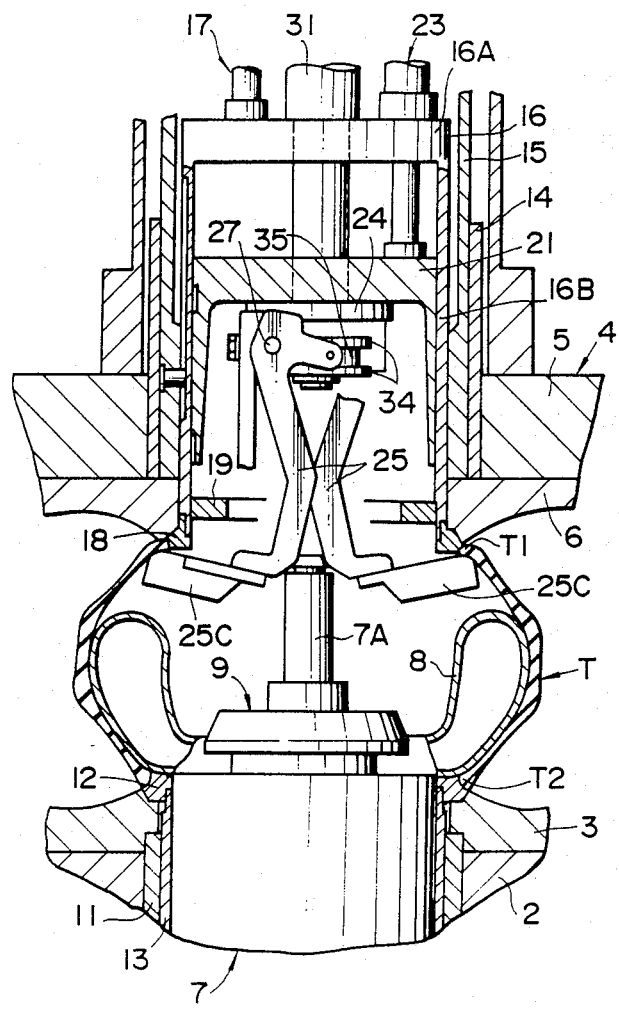

If the fluid cylinder 33 (refer to FIG. 2) of the sector opening and closing mechanism 28 is then expanded in such a condition as shown in FIG. 10 or 19, the inner tube 29 is moved down whereupon the cam ring 36 mounted at the lower end of the inner tube 29 is also moved down. Since the cam rollers 39 on the sectors 25 are held in engagement with the cam ring 36, the sectors 25 supported around the pivot shaft 27 are pivoted so that the chucking portions 25C thereof are opened as shown in FIG. 11 until they are pressed against an inner face side of the upper bead T1 of the green tire T. Accordingly, the upper beam T1 of the green tire T is gripped between the upper bead ring 18 of the inner cylinder 16 and the chucking portions 25C of the sectors 25 so that the green tire T is mechanically suspended on the sectors 25 as seen in FIG. 11.

In the case of the tire vulcanizing press of the second embodiment, when the sectoral portions 25C of the chucks 25 are moved to their open position, they are moved accurately due to a guiding action of the concave and convex means 47, and due to the presence of the concave and convex ribs 47A and 47B of the concave and convex means 47, the gap 48 is minimized as seen in FIG. 20. (i.e., becomes smaller than that in the case of the tire vulcanizing press of the third embodiment).

Upon such suspension, since the chucking portions 25C of the sectors 25 exhibit each a sectoral shape or part-circular shape in the tire vulcanizing press of each of the first to third embodiments and are disposed in radially outward directions, they can chuck and suspend the green tire T with certainty thereon.

In a condition in which the mechanically suspended or hung condition of the green tire T by the upper bead ring 18 and the chucking portions 25C of the sectors 25 is maintained, the upper and lower die elements 1 and 4 are closed relative to each other. Thereupon, the lower bead ring 12 is pressed against the lower bead T2 of the green tire T. Afterwards, pressurized fluid (i.e., air) is fed into the green tire T via the inner tube 29 as indicated by an arrow mark C in FIG. 11 to inflate the green tire T.

Subsequently, the inner cylinder 16 is moved up relative to the other cylinder 15 until the upper bead ring 18 is fitted into the recess 6A of the upper die half 6 so that it becomes part of the upper die half 6. In this condition, a heated pressuring medium such as steam is supplied into the elastic forming member 8 of the central mechanism 7 to inflate the green tire T so that the inner wall of the green tire T is successively shaped from the lower side.

It is to be noted that, even if the top portion 7A of the central mechanism 7 is projected upwardly in such a shaping step as described above, possible interference thereof with the sectors 25 is prevented because the sectors 25 are arranged in radial directions with the links 25B thereof extended in vertical directions and with the chucking portions 25C thereof projected in radially outward directions and the top portion 7A of the central mechanism 7 will be projected into a spacing at a location encircled by the links 25B of the sectors 25.

Meanwhile, in the case of the tire vulcanizing press of the second or third embodiment, the upper mounting ring 9 is retained by the ring fitting portion 25G of the filler ring 46 as indicated in phantom in FIG. 22 and the elastic forming member 8 is prevented from contacting directly with the sectoral portions 25C of the sectors by the filler ring 46, and besides the elastic forming member 8 is prevented from engaging with the sectoral portions 25C of the sectors 25 via the gap 48.

Figure 13:
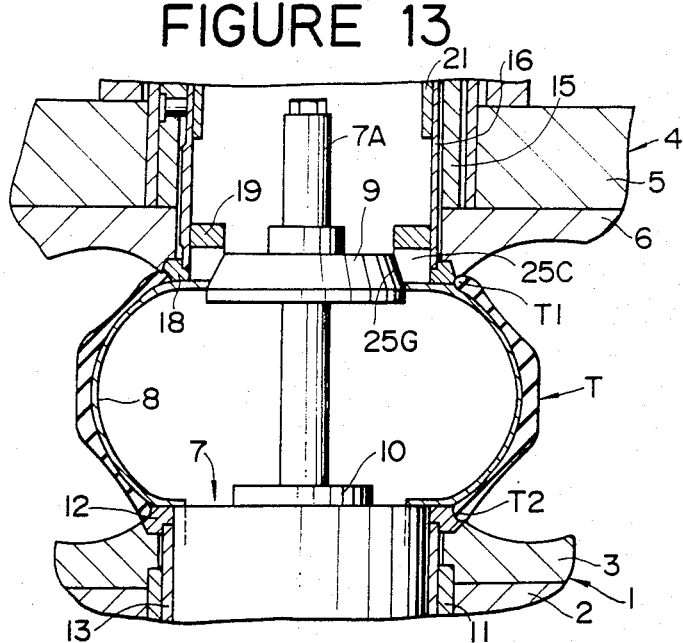

Near the final stage of such shaping, the sectors 25 are moved to the closed position by a closing operation of the cam ring 36 and a relative upward movement of the sector housing 21 so that the chucking portions 25C thereof are accommodated within the inner cylinder 16 as seen in FIG. 13. Besides, in the case of the tire vulcanizing press of the first embodiment, the upper mounting ring 9 is fitted into the ring fitting portion 25G of the sectoral portions 25C of the sectors 25 and thus held fixedly by the latter as seen in FIG. 13.

In the case of the tire vulcanizing press of the second embodiment, the sectoral portions 25C of the sectors 25 are closed under a guiding action of the concave and convex means 47 and thus received on the filler ring 46.

Subsequently, the green tire T is vulcanized and shaped in such a closed condition of the die as shown in FIG. 14. In this instance, the upper bead ring 18 serves as part of the die while the chucking portions 25C of the sectors 25 are accommodated in the inner cylinder 16. Accordingly, the conformability of the elastic forming member 8 is maintained well.

Figure 15:
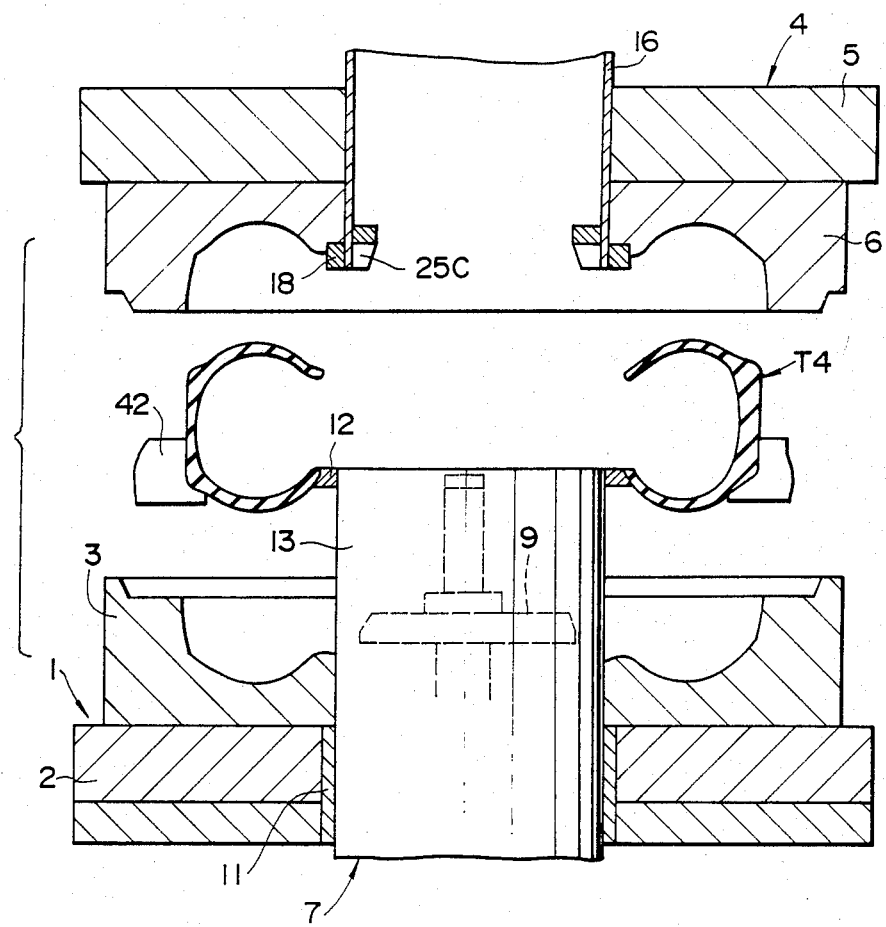

After completion of the predetermined vulcanizing shaping, the elastic forming member 8 of the central mechanism 7 is contracted and thus accommodated into the central mechanism 7 and then the die is opened. Then, the shaped tire T4 is removed from the die by means of the lower bead ring 12 of the central mechanism 7 as shown in FIG. 15 and then carried out from the die by means of the carrying in member 42.

Having now fully described the invention, it will be apparent to one of ordinary skill in the art that many changes and modifications can be made thereto without departing from the spirit and scope of the invention as set forth herein.

What is claimed as new and desired to be secured by Letters Patent of the United States is:

1. A tire vulcanizing press wherein an upper die element and a lower die element are mounted for opening and closing movement relative to each other and a plurality of sectors each having a link extending in a vertical direction and a sectoral portion extending in a radially outward direction from a lower end of said link are mounted in a radial arrangement for movement between an open position and a closed position such that an upper bead of a green tire may be gripped and loaded in position between said die elements by means of said sectors and wherein the inner face of a tire loaded in position between said die elements is shaped and the tire is vulcanized by means of an expandable and contractible elastic forming member and a heated pressurizing medium supplied into said elastic forming member, comprising:

an inner cylinder mounted for relative up and down movement on said upper die element and having at a lower end portion thereof a bead ring adapted to form part of said upper die element; and a sector housing mounted for relative up and down movement in said inner cylinder and having movably mounted thereon said plurality of sectors for movement between the open position and the closed position;

the upper bead of the green tire being adapted for being gripped between said bead ring provided on said inner cylinder and said sectoral portions of said sectors;

said sectoral portions of said sectors being adapted for being accommodated in the lower end portion of said inner cylinder when said sectors are in the closed position;

an upper mounting ring having said elastic forming member thereon; and a ring fitting portion being provided for receiving and retaining therein during vulcanization said upper mounting ring.

2. A tire vulcanizing press according to claim 1, wherein said ring fitting portion is formed on the lower side of said sectoral portions of said sectors.

3. A tire vulcanizing press according to claim 1, wherein a filler ring is mounted at a lower end portion of said sector housing; said sector portions of said sectors in the closed position are positioned on said filler ring; said sectoral portions of said sectors project in radially outward directions farther than said filler ring in order to grip the upper bead of the green tire thereon; and said ring fitting portion is provided on the lower face side of said filler ring which is located below said sectoral portions of said sectors.

4. A tire vulcanizing press according to claim 3, wherein concave and convex means are provided on mutually contacting faces of said sectoral portions of said sectors and said filler ring for guiding said sectors for movement between the open position and the closed position and for preventing said elastic forming member from advancing between said filler ring and said sectoral portions of said sectors in the open position.

5. A tire vulcanizing press according to any one of the claims 3 or 4, wherein said filler ring has a mirror surface for reducing abrasion thereof by sliding contact thereof with said elastic forming member.

* * * * *

UNITED STATES PATENT AND TRADEMARK OFFICE
CERTIFICATE OF CORRECTION

PATENT NO.  : 4,874,303
DATED       : Oct. 17, 1989
INVENTOR(S) : Katumi Ichikawa, et al It is certified that error appears in the above-identified patent and that said Letters Patent is hereby corrected as shown below:

On the title page;

The third and the fifth inventor's names are incorrectly recorded "Yasuhiko Hujieda" and "Seisuke Hukumura" should be:

--Yasuhiko Fujieda- and -Seisuke Fukumura--

Signed and Sealed this

Fourth Day of December, 1990

Attest:

HARRY F. MANBECK, JR.

*Attesting Officer*   *Commissioner of Patents and Trademarks*